(12) United States Patent
Devadas

(10) Patent No.: US 8,683,210 B2
(45) Date of Patent: Mar. 25, 2014

(54) NON-NETWORKED RFID-PUF AUTHENTICATION

(75) Inventor: Srinivas Devadas, Lexington, MA (US)

(73) Assignee: Verayo, Inc., San Jose, CA (US)

( * ) Notice: Subject to any disclaimer, the term of this patent is extended or adjusted under 35 U.S.C. 154(b) by 964 days.

(21) Appl. No.: 12/623,045

(22) Filed: Nov. 20, 2009

(65) Prior Publication Data

US 2010/0127822 A1 May 27, 2010

Related U.S. Application Data

(60) Provisional application No. 61/247,195, filed on Sep. 30, 2009, provisional application No. 61/161,218, filed on Mar. 18, 2009, provisional application No. 61/116,700, filed on Nov. 21, 2008.

(51) Int. Cl.
*G06F 21/00* (2013.01)
(52) U.S. Cl.
USPC .......................................... 713/185; 380/44
(58) Field of Classification Search
USPC ...................... 380/44; 713/168, 185
See application file for complete search history.

(56) References Cited

U.S. PATENT DOCUMENTS

| | | | |
|---|---|---|---|
| 4,985,614 A | 1/1991 | Pease | |
| 5,177,352 A | 1/1993 | Carson | |
| 5,180,901 A * | 1/1993 | Hiramatsu | 235/380 |
| 5,204,902 A | 4/1993 | Reeds | |
| 5,247,577 A | 9/1993 | Bailey | |
| 5,375,169 A | 12/1994 | Seheidt | |
| 5,388,157 A | 2/1995 | Austin | |
| 5,528,231 A | 6/1996 | Patarin | |
| 5,768,382 A | 6/1998 | Schneier | |
| 5,818,738 A | 10/1998 | Effing | |
| 5,862,094 A | 1/1999 | Kawabata | |
| 5,883,956 A | 3/1999 | Le | |
| 5,920,628 A | 7/1999 | Indeck | |
| 5,963,104 A | 10/1999 | Buer | |
| 6,026,293 A | 2/2000 | Osborn | |
| 6,038,315 A | 3/2000 | Strait et al. | |
| 6,047,068 A | 4/2000 | Rhelimi et al. | |
| 6,161,213 A | 12/2000 | Lofstrom | |
| 6,233,339 B1 * | 5/2001 | Kawano et al. | 380/44 |

(Continued)

FOREIGN PATENT DOCUMENTS

| | | |
|---|---|---|
| CA | 2344429 | 3/2000 |
| DE | 19843424 | 3/2000 |

(Continued)

OTHER PUBLICATIONS

Leonid Bolotnyy; Physically Unclonable Function-Based Security and Privacy in RFID Systems; Year: 2007; IEEE; pp. 1-8.*

(Continued)

*Primary Examiner* — Mohammad W Reza
*Assistant Examiner* — Monjour Rahim
(74) *Attorney, Agent, or Firm* — Occhiuti & Rohlicek LLP

(57) ABSTRACT

An integrated circuit includes a sequence generator configured to generate a series of challenges; a hidden output generator configured to generate a series of hidden outputs, each hidden output a function of a corresponding challenge in the series of challenges; and bit reduction circuitry configured to generate a response sequence including a plurality of response parts, each response part a function of a corresponding plurality of hidden outputs.

40 Claims, 8 Drawing Sheets

(56) References Cited

U.S. PATENT DOCUMENTS

| | | | |
|---|---|---|---|
| 6,246,254 B1* | 6/2001 | Choukalos et al. | 326/8 |
| 6,289,292 B1 | 9/2001 | Charlton | |
| 6,289,453 B1* | 9/2001 | Walker et al. | 713/175 |
| 6,289,455 B1 | 9/2001 | Kocher et al. | |
| 6,301,695 B1 | 10/2001 | Burnham | |
| 6,305,005 B1 | 10/2001 | Burnham | |
| 6,324,676 B1 | 11/2001 | Burnham | |
| 6,363,485 B1 | 3/2002 | Adams | |
| 6,386,456 B1 | 5/2002 | Chen | |
| 6,402,028 B1 | 6/2002 | Graham, Jr. | |
| 6,529,793 B1 | 3/2003 | Beffa | |
| 6,535,016 B2 | 3/2003 | Choukalos | |
| 6,848,049 B1 | 1/2005 | Tailhet | |
| 7,568,113 B2 | 7/2009 | Linnartz | |
| 7,577,850 B2 | 8/2009 | Barr | |
| 2001/0032318 A1 | 10/2001 | Yip | |
| 2001/0033012 A1 | 10/2001 | Kommerling | |
| 2002/0065574 A1 | 5/2002 | Nakada | |
| 2002/0095594 A1 | 7/2002 | Dellmo | |
| 2002/0106087 A1 | 8/2002 | Lotspiech | |
| 2002/0107798 A1 | 8/2002 | Hameau | |
| 2002/0128983 A1 | 9/2002 | Wrona | |
| 2002/0150252 A1 | 10/2002 | Wong | |
| 2002/0188857 A1 | 12/2002 | Orlando et al. | |
| 2002/0199110 A1 | 12/2002 | Kean | |
| 2003/0204731 A1 | 10/2003 | Pochuev | |
| 2003/0204743 A1 | 10/2003 | Devadas | |
| 2003/0219121 A1 | 11/2003 | Van Someren | |
| 2004/0136529 A1 | 7/2004 | Rhelimi et al. | |
| 2004/0148509 A1 | 7/2004 | Wu | |
| 2005/0051351 A1 | 3/2005 | De Jongh | |
| 2005/0198404 A1* | 9/2005 | Kawakami et al. | 710/1 |
| 2007/0038871 A1 | 2/2007 | Kahlman | |
| 2007/0039046 A1 | 2/2007 | Van Dijk | |
| 2007/0044139 A1 | 2/2007 | Tuyls | |
| 2007/0180009 A1* | 8/2007 | Gutnik | 708/250 |
| 2008/0044027 A1 | 2/2008 | Van Dijk | |
| 2008/0059809 A1 | 3/2008 | Van Dijk | |
| 2008/0106605 A1 | 5/2008 | Schrijen | |
| 2009/0282259 A1* | 11/2009 | Skoric et al. | 713/185 |
| 2009/0292921 A1 | 11/2009 | Braun et al. | |
| 2010/0073147 A1 | 3/2010 | Guajardo Merchan et al. | |
| 2011/0002461 A1* | 1/2011 | Erhart et al. | 380/44 |
| 2011/0213972 A1* | 9/2011 | Chabanne et al. | 713/168 |

FOREIGN PATENT DOCUMENTS

| | | |
|---|---|---|
| EP | 1100058 | 5/2001 |
| EP | 1341214 | 9/2003 |
| WO | WO2007/116368 | 10/2007 |
| WO | WO2008/040655 | 4/2008 |
| WO | WO2008/068644 | 6/2008 |

OTHER PUBLICATIONS

Arazi, B. "Interleaving Security and Efficiency Consiederations in the Design of Inexpensive IC Cards". IEEE Proceedings on Computers and Digital Techniques, vol. 141, Issue 5. Publ Date, Sep. 1994, pp. 265-270.

Hon-Sum Wong et al. "Three-Dimensional "Atomistic" Simulation of Discrete Random Dopant Distribution Effects in Sub-0.1 μm MOSFET's", IEDM, 29(2):705-708, 1993.

Bennet Yee, "Using Secure Coprocessors," Carnegie Mellon University, Pittsburg, PA. May 1994.

Ross Anderson et al. "Low Cost Attacks on Tamper Resistant Devices". Cambridge University, Cambridge, England. Apr. 1997.

Mimlor et al., "Logic Product Speed Evaluation and Forecasting During the early phases of Process Technology Development Using Ring Oscillator Data," 2nd International Work Statistical Metrology, 1997 pp. 20-23.

Ross Anderson et al., "Tamper Resistance—a Cautionary Note" Cambridge University, Cambridge, England. Nov. 1996.

Tuyls et al., "Information-Theoretic Security Analysis of Physical Uncloneable Functions," Proceedings ISIT 2004 (Chicago), p. 141.

Omura, J.K., "Novel Application of Cryptogrtaphy in Digital Communications," IEEE Comm. Mag., May 1990, pp. 21-29.

Srinivas Devadas et al., "Synthesis of Robust Delay-Fault Testable Circuits Practice" Massachusetts Institute of Technology, Cambridge, MA Mar. 1992.

Srinivas Devadas et al., "Synthesis of Robust Delay-Fault Testable Circuits Thoery" Massachusetts Institute of Technology, Cambridge, MA Jan. 1992.

Sean W. Smith et al., "Building a High-Performance, Programmable Secure Coprocessor", IBM T.J. Watson Research Center, Yorktown Heights, NY. Oct. 16, 1998.

Duane S. Boning et al., "Models of Process Variations in Device and Interconnect," Massachusetts Institute of Technology, Cambridge, MA Aug. 23, 1999.

Ravikanth. Pappu Srinivasa. "Physical One-Way Functions", Massachusetts Institute of Technology, Cambridge, MA. Mar. 2001.

Blaise Gassend et al., "Silicon Physical Unknown Functions and Smartcards," Massachusetts Institute of Technology, Cambridge, MA May 13, 2002.

Blaise Gassend et al., "Controlled Physical Unknown Functions: Applications to Secure Smartcards and Certified Execution," Massachusetts Institute of Technology, Cambridge, Jun. 10, 2002.

Blaise Gassend et al., "Silicon Physical Random Functions", MIT, Proceedings of the Computer and Communication Security Conference, Nov. 2002, Memo 456.

Blaise Gassend, "Physical Random Functions," Massachusetts Institute of Technology, Cambridge MA Feb. 2003.

Gassend, B.L.P., Physical Random Functions; Thesis, Thesis at the Massachusetts Institute of Technology, pp. 1-89 (Feb. 1, 2003) XP002316843.

Daihyun Lim, "Extracting Secret Keys from Integrated Circuits" Massachusetts Institute of Technology, Cambridge, MA, May 2004.

Lee et al., "A Technique to Build a Secret Key in Integrated Circuits for Identification and Authentication Applications," Massachusetts Institute of Technology (CSAIL) Jun. 2004.

Xilinx (Ralf Krueger) "Using High Security Features in Virtex-II Series FPGAs" www.xilinx.com; [printed Jul. 8, 2004].

Ranasighe et al., "Security and Provacy Solutions for Low-Cost RFID Systems," (2004).

Tuyls, Pirm and Lejla Batina, "RFID—Tags for Anti-Counterfeiting," Topics in Cryptography, vol. 3860/2006, No. LNCS3860, (Feb. 13, 2005) XP002532233.

Tuly et al., "Security Analysis of Physical Uncloneable Functions, " Proc. 9th Conf. on Financial Cryptography and Data Security, Mar. 2005, LNCS 3570, pp. 141-155.

G. Edward Suh, et al., "Design and Implementation of the AEGIS Single-Chip Secure Processor Using Physical Random Functions," In the proceedings of the 32nd International Symposium on Computer Architecture, Madison, Wisconsin, Architecture, Jun. 2005 (Memo-483).

Skoric et al., "Robust Key Extraction from Physical Uncloneable Functions," Proc. Applied Cryptography and Network Security 2005, LNCS 3531, pp. 407-422.

Bolotnyy et al., "Physically Uncloneable Function-Based Security and Privacy in RFID Systems," Pervasive Computing and Communications, 2007, PERCOM '07, Fifth Annual IEEE International Conference, IEEE, PI, Mar. 1, 2007, pp. 211-220 (XP031070403).

* cited by examiner

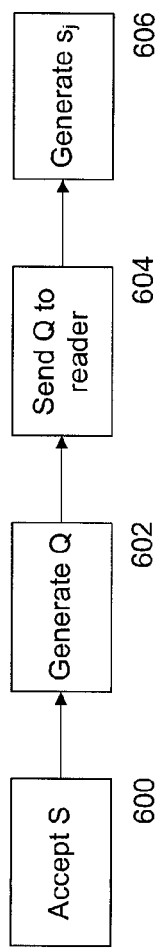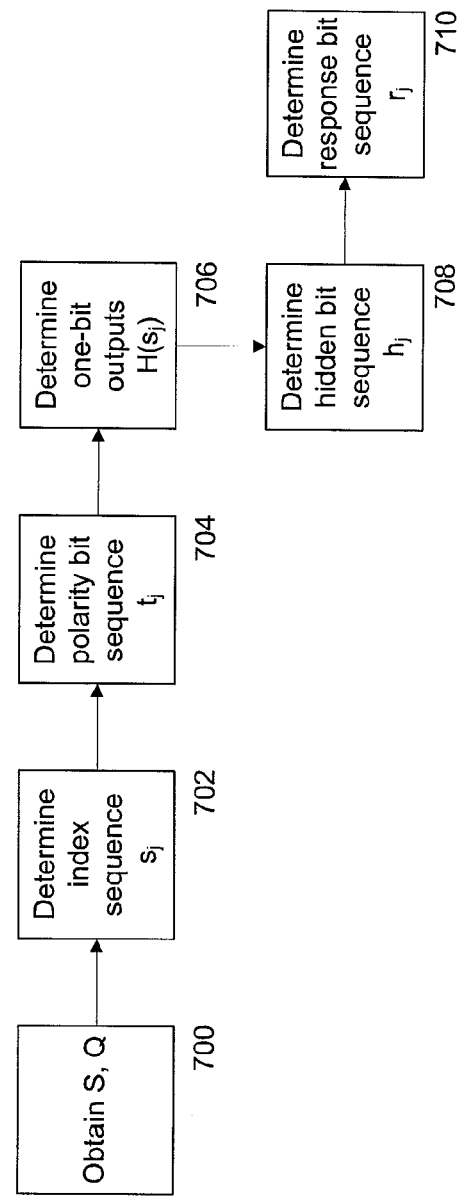

NON-NETWORKED RFID-PUF AUTHENTICATION

CROSS-REFERENCE TO RELATED APPLICATIONS

This application claims priority to U.S. Provisional Applications No. 61/116,700, titled "Non-Networked RFID-PUF Authentication," filed Nov. 21, 2008; No. 61/161,218, titled "Non-Networked RFID Authentication," filed Mar. 18, 2009; and No. 61/247,195, titled "Non-Networked RFID Authentication," filed Sep. 30, 2009, the contents of all of which are incorporated herein by reference.

This application is related to U.S. Application Pub. No. US2009/0083833 A1, titled "Authentication With Physical Unclonable Functions," filed Sep. 19, 2008, claiming the benefit of U.S. Provisional Applications No. 60/973,505, titled "Authentication Systems Involving Physically Unclonable Functions" and No. 61/018,618, titled "Secure RFID." This application is also related to U.S. Pat. No. 7,564,345, titled "Volatile Device Keys and Applications Thereof," issued Jul. 21, 2009, and filed Nov. 14, 2005, claiming the benefit of U.S. Provisional Applications No. 60/627,605, filed Nov. 12, 2004; No. 60/629,953, filed Nov. 22, 2004; and No. 60/647,575, filed Jan. 27, 2005. The contents of the applications identified above are incorporated herein by reference.

BACKGROUND

This invention relates to non-networked RFID authentication.

The very nature of products moving across multiple locations over long distances and under the responsibility of different entities (businesses or individuals) provides many opportunities for a supply chain to be compromised. Containers of high-value products, such as luxury goods, sports collectibles, and pharmaceuticals, may be accessed at various points in the supply chain and replaced with counterfeit or compromised products with minimal disruption to normal supply chain activity.

In recent years, radio frequency identification device (RFID) technology has been adopted by manufacturers of high-value products to track and secure products as they move through the supply chain. RFID tags typically take the form of a self-adhesive label with an integrated "silicon chip-antenna" unit. These labels can be adhered (or otherwise affixed) to individual products or used to seal containers holding multiple products. Each RFID tag is operable to receive and response to radio frequency signals from an RFID transceiver. Because the tags' electronic memory can be read or written from a distance, a direct line of sight with the product or container is not necessary to track its whereabouts. Products are tracked as they make their way from the manufacturer to their final destination through multiple intermediaries (e.g., distributors and retailers), and tag readers are notified if a tag or product somehow strays from the designated route.

SUMMARY

In a general aspect, an integrated circuit includes a sequence generator configured to generate a series of challenges; a hidden output generator configured to generate a series of hidden outputs, each hidden output a function of a corresponding challenge in the series of challenges; and bit reduction circuitry configured to generate a response sequence including a plurality of response parts, each response part a function of a corresponding plurality of hidden outputs.

Embodiments may include one or more of the following. The integrated circuit includes a nonvolatile memory configured to store encrypted data corresponding to at least one of the series of hidden outputs or parameters derived based on the series of hidden outputs.

The sequence generator is configured to generate the series of challenges on the basis of a first seed inputted into the integrated circuit. The sequence generator is further configured to generate the series of challenges on the basis of a second seed generated by the integrated circuit. The sequence generator includes a first generator configured to generate a series of generator values; and an index register configured to select a subset of the bits of each generator value, each subset forming a challenge in the series of challenges. The first generator includes a linear feedback shift register.

Each response part in the response sequence is a nonlinear function of the corresponding plurality of hidden outputs. Each response part in the response sequence is determined on the basis of a number of bits having a value of one in the corresponding plurality of hidden outputs. The bit reduction circuitry includes counting circuitry configured to, for each response part in the response sequence, count a first number of bits having a value of one in a first portion of the corresponding plurality of hidden outputs and a second number of bits having a value of one in a second portion of the corresponding plurality of hidden outputs; and comparison circuitry configured to compare the first number of bits and the second number of bits. The result of the comparison forms the corresponding response part in the response sequence.

The hidden output generator includes physically unclonable function (PUF) circuitry. The PUF circuitry comprises delay-based PUF circuitry. Each hidden output is a function of characteristics of the hidden output generator that vary due to fabrication characteristics among a plurality of like integrated circuits.

The hidden output generator further comprises involution logic configured to apply a plurality of permutation functions to each challenge to generate a corresponding plurality of inner challenges. The hidden output generator is configured to generate a subseries of hidden outputs corresponding to each challenge in the series of challenges, each hidden output in the subseries of hidden outputs generated by application of one of the inner challenges to the PUF circuitry. The integrated circuit further includes comparison circuitry configured to compare the hidden outputs in the subseries of hidden outputs.

The hidden output generator includes first PUF circuitry and second PUF circuitry, each PUF circuitry configured to generate a PUF output based on a first challenge in the series of challenges; and comparison circuitry configured to compare the PUF output generated by the first PUF circuitry and the PUF output generated by the second PUF circuitry, the result of the comparison forming the hidden output corresponding to the first challenge.

The PUF circuitry is configured to generate a first PUF output based on a first challenge in the series of challenges and to generate a second PUF output based on a second challenge in the series of challenges. The hidden output generator includes comparison circuitry configured to compare the first PUF output and the second PUF output, the result of the comparison forming the hidden output corresponding to the first challenge.

The hidden output generator includes bit expansion circuitry configured to generate an inner challenge based on a first challenge in the series of challenges, the inner challenge longer than the first challenge. The PUF circuitry is configured to generate a PUF output based on the inner challenge. The integrated circuit includes comparison circuitry configured to compare each PUF output with a corresponding polarity bit, the result of each comparison forming a hidden output.

The integrated circuit includes access control circuitry configured to receive a value inputted into the integrated circuit and, on the basis of the received value, to allow the series of hidden outputs to be outputted from the integrated circuit. The access control circuitry includes one-way circuitry configured to apply a one-way function to the received value; comparison circuitry configured to compare the result of the one-way function with a device-specific value stored in the integrate circuit; and enabler circuitry configured to receive the result of the comparison and, based on the received result, to allow the series of hidden outputs to be outputted from the integrated circuit. At least a part of the one-way circuitry forms part of the circuitry of the sequence generator.

In another general aspect, a method for authenticating an integrated circuit using an authentication station includes, on the integrated circuit, performing the steps of generating a series of challenges; generating a series of hidden outputs, each hidden output a function of a corresponding challenge in the series of challenges; and generating a response sequence including a plurality of response parts, each response part a function of a corresponding plurality of hidden outputs.

Embodiments may include one or more of the following. The method includes providing the response sequence to the authentication station. The method includes, at the authentication station, performing the steps of receiving the series of hidden outputs from the integrated circuit; receiving the response sequence from the integrated circuit; using the series of hidden outputs, determining a simulated response sequence; and determining whether the received response sequence is substantially equivalent to the simulated response sequence.

The method includes enrolling the integrated circuit. Enrolling the integrated circuit includes providing at least one of the series of hidden outputs or parameters derived based on the series of hidden outputs to the authentication station; receiving, from the authentication station, encrypted data corresponding to the series of hidden outputs or to the parameters derived based on the series of hidden outputs; and storing the encrypted data in a nonvolatile memory on the integrated circuit. The parameters derived based on the series of hidden outputs comprise a parameterized form of the series of hidden outputs. The series of hidden outputs is provided to the authentication station on the basis of a password received from the authentication station. Enrolling the integrated circuit includes receiving the password from the authentication station; performing a one-way function on the password; comparing the result of the one-way function with a value stored on the integrated circuit; and based on the result of the comparison, providing the series of hidden outputs to the authentication station.

Generating the series of challenges includes generating the series of challenges on the basis of a first seed generated by the authentication station. Generating the series of challenges includes generating the series of challenges on the basis of a second seed generated by the integrated circuit. Generating the series of challenges includes generating a series of generator values; and selecting a subset of the bits of each generator value, each selected subset forming a challenge in the series of challenges.

Generating the response sequence includes, for each response part in the response sequence, operating on the corresponding plurality of hidden outputs with a nonlinear function. Generating a series of hidden outputs includes generating the series of hidden outputs using physical unclonable function (PUF) circuitry. Using PUF circuitry includes using delay-based PUF circuitry.

Generating the series of hidden outputs includes generating a subseries of hidden outputs corresponding to each challenge in the series of challenges. Generating the series of hidden outputs includes applying a plurality of permutation functions to a first challenge to generate a corresponding plurality of inner challenges; applying each inner challenge to PUF circuitry to generate a corresponding hidden output in the subseries of hidden outputs corresponding to the first challenge; and comparing the hidden outputs in subseries corresponding to the first challenge.

Generating the series of hidden bit outputs includes using first PUF circuitry, generating a first PUF output based on a first challenge in the series of challenges; using second PUF circuitry, generating a second PUF output based on the first challenge; and comparing the first PUF output and the second PUF output, the result of the comparison forming the hidden output corresponding to the first challenge.

Generating the series of hidden outputs includes generating a first PUF output based on a first challenge in the series of challenges; generating a second PUF output based on a second challenge in the series of challenges; and comparing the first PUF output and the second PUF output, the result of the comparison forming the hidden output corresponding to the first challenge.

Generating the series of hidden outputs includes generating an inner challenge based on a first challenge in the series of challenges, the inner challenge longer than the first challenge; and using the PUF circuitry to generate the hidden output based on the inner challenge.

Among other advantages, the devices and methods described herein are applicable to an item-level authentication approach for preserving the integrity of a product's supply chain. The use of RFID tags as described herein prevents "cloning" of the tags, or at least makes such cloning prohibitively computationally expensive.

RFID tags such as those described herein can be authenticated in a non-networked or limited-networked environment, such as a warehouse or shipping facility, or in a networked environment in which the PUF databases are stored at a central server on the network rather than on each individual tag. The authentication schemes described herein provide a high degree of reliable authentication security at a lower cost than conventional cryptographic techniques.

BRIEF DESCRIPTION OF DRAWINGS

FIG. 6 is a flow chart of the index generation process.
FIG. 7 is a flow chart of the response generation process.

DETAILED DESCRIPTION

Generally, a physical unclonable function (PUF) in an electronic circuit provides a way to distinguish integrated circuits ("chips") from one another based, for instance, on fabrication variations that cause different chips fabricated according to a common design (i.e., a common mask) to have measurably different characteristics. The ability to distinguish one chip from another using a PUF is a potentially valuable way to authenticate integrated circuits. One or more approaches described below relate to particular PUF implementations suitable for use in proximity devices, such as Radio Frequency Identification (RFID) tags.

In some examples, an RFID tag manufacturer produces a batch of RFID tags. Each RFID tag of the batch (referred to in this description as an enhanced PUF-based RFID tag, or simply an "e-PUF tag") is implemented with a hidden output generation function and a public bit reduction function, and includes multiple memory components, some of which are read-only and others of which are write- or read/write-capable.

Figure 1:
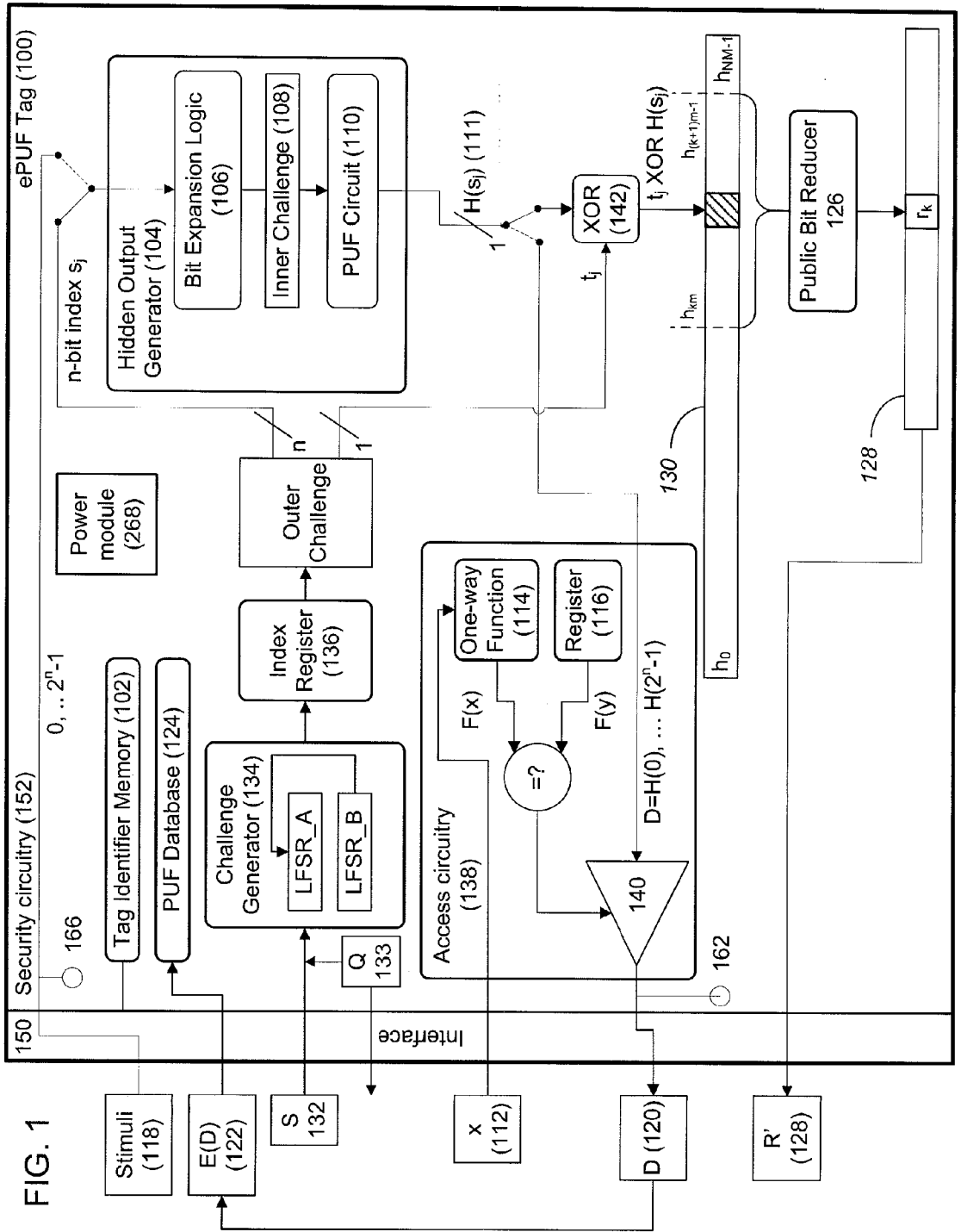
FIG. 1 is a block diagram of an enhanced PUF-based (ePUF) RFID tag.

Referring to FIG. 1, an exemplary ePUF tag 100 includes an RFID communication interface 150 and security circuitry 152. A first read-only memory component, Tag Identifier Memory 102, of ePUF tag 100 stores a unique tag identifier, such as a 128-bit long electronic product code (EPC). Depending upon the encoding scheme of the tag identifier, the structure of the tag identifier may include fields that identify the batch with which tag 100 is associated, a shipping container code, a destination code, or a product code. Other and/or different information may also be included in the tag identifier.

1 Response Generation

A hidden output generation function implemented on ePUF tag 100 has an unpredictable input-output characteristic that cannot be determined based on examination of the ePUF tag, or at least requires significant effort to be determined. The characteristics of the hidden output generation function can thus be considered effectively unobtainable by an adversary. The hidden output generation function is implemented on ePUF tag 100 by a hidden output generator, which accepts as input an n-bit index $s_j$ (e.g., a 9-bit or a 12-bit index) and produces a hidden output $h_j$. In some embodiments, hidden output $h_j$ is a single bit; in other embodiments, hidden output $h_j$ includes multiple bits.

Referring to FIG. 1, in one embodiment, a hidden output generator 104 is implemented as a cascade of bit expansion logic 106, which accepts the 9-bit index $s_j$ and produces a 64-bit inner challenge 108; and a PUF circuit 110, which generates a PUF output $H(s_j)$ in response to inner challenge 108. For instance, the PUF circuit may be implemented as a delay-based PUF, as described in U.S. Application Pub. No. US 2006/0221686 A1, entitled "Integrated Circuit That Uses A Dynamic Characteristic of the Circuit" and filed Jun. 1, 2006, the contents of which are incorporated herein by reference. In this example, inner challenge 108 configures a set of delay paths and the hidden output $H(s_j)$ is based on the relative delays of the configured paths.

In some instances, bit expansion logic 106 is implemented using a second read-only memory component (not shown) of ePUF tag 100 that defines a challenge table providing one-to-one mapping of 9- or 12-bit index values that are converted to 64-bit challenges. In some instances, every ePUF tag 100 of a batch has an identical challenge table. In other instances, subsets of ePUF tags of a batch (e.g., grouped by shipping container code, destination code, product code, etc.) have different challenge tables. In other instances, bit expansion logic 106 is implemented by combinational circuitry, for instance, that generates n(n-1)/2 bits by XORing pairs of bits of index $s_j$ and generates another n(n-1)/2 bits by XNORing pairs of index bits. This circuitry ensures that, for a given index $s_j$, the challenge generated by the bit expansion logic is always the same.

Each PUF output $H(s_j)$ is selectively inverted according to (i.e., XORed with) the value of a polarity bit $t_j$ corresponding to the index $s_j$ (discussed below) by inversion circuitry 142. The sequence of outputs from the XOR function (i.e., $h_j=t_j$ XOR $H(s_j)$) forms a hidden output sequence 130 which is not disclosed outside of ePUF tag 100. Hidden output sequence 130 is reduced to a shorter response sequence R' 128 using a public bit reduction function R( ) implemented by a public bit reducer 126 (discussed in greater detail below). Each response part r (e.g., each bit or each group of bits) of response sequence R' 128 is determined by the application of the bit reduction function to a subsequence of the hidden output sequence 130. The response sequence R' is output from ePUF tag 100 during the authentication phase via RFID interface 150.

In some alternative embodiments, the hidden output generator does not include bit expansion logic and the index $s_j$ is provided directly as a challenge to the PUF circuit. Without bit expansion logic, for some designs of PUF circuitry, the behavior of the PUF circuit can be modeled relatively easily by an attacker, thus undermining the security of the ePUF tag. To avoid such modeling attacks, an output of the PUF circuit is selectively inverted (i.e., XORed) with another output (or outputs) of the same PUF circuit based on a different challenge or with an output of another PUF circuit. A number of such implementations are described below.

Figure 3:
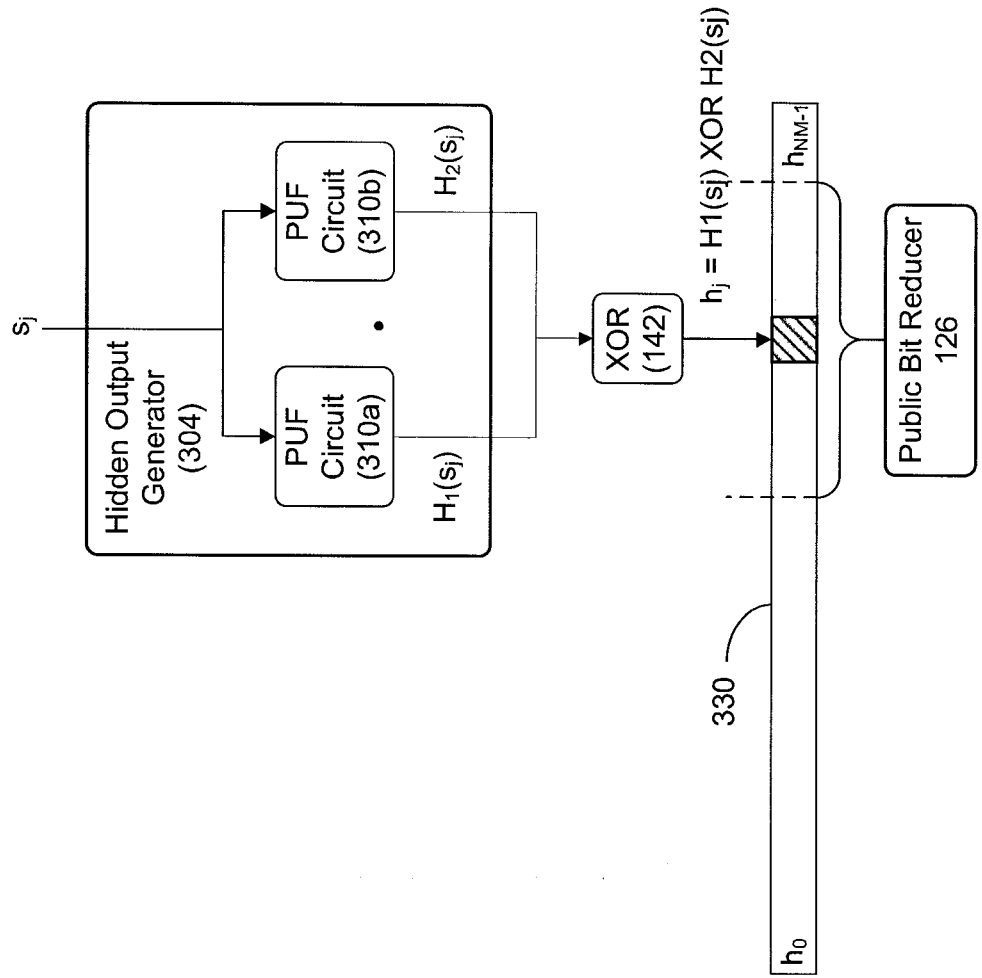
FIG. 3 is a block diagram of a hidden output generator.

Referring to FIG. 3, a hidden output generator 304 includes a first PUF circuit 310a and a second PUF circuit 310b. Each PUF circuit 310a, 310b accepts the challenge $s_j$ and generates a PUF output $H_1(s_j)$ and $H_2(s_j)$, respectively. The PUF outputs $H_1(s_j)$ and $H_2(s_j)$ are XORed by XOR circuitry 142. The result forms the jth component of a hidden output sequence 330 (i.e., $h_j=H_1(s_j)$ XOR $H_2(s_j)$) which is operated on by public bit reducer 126 as described above. In some embodiments, hidden output generator 304 includes more than two PUF circuits, each PUF circuit accepting the challenge $s_j$ and returning a PUF output $H_i(s_j)$. The resulting PUF outputs from the n PUF circuits are n-way XORed to generate the corresponding component $h_j$ of the hidden output sequence. For instance, for a hidden output generator having 4 PUF circuits, the four resulting outputs are 4-way XORed; for a hidden output generator having 8 PUF circuits, the eight resulting outputs are 8-way XORed. A large number of PUF circuits make it more difficult for an adversary to model the behavior of hidden output generator 304, thus improving the security of the ePUF tag. However, many PUF circuits occupy a large amount of space within the layout of security circuitry 152.

Figure 4:
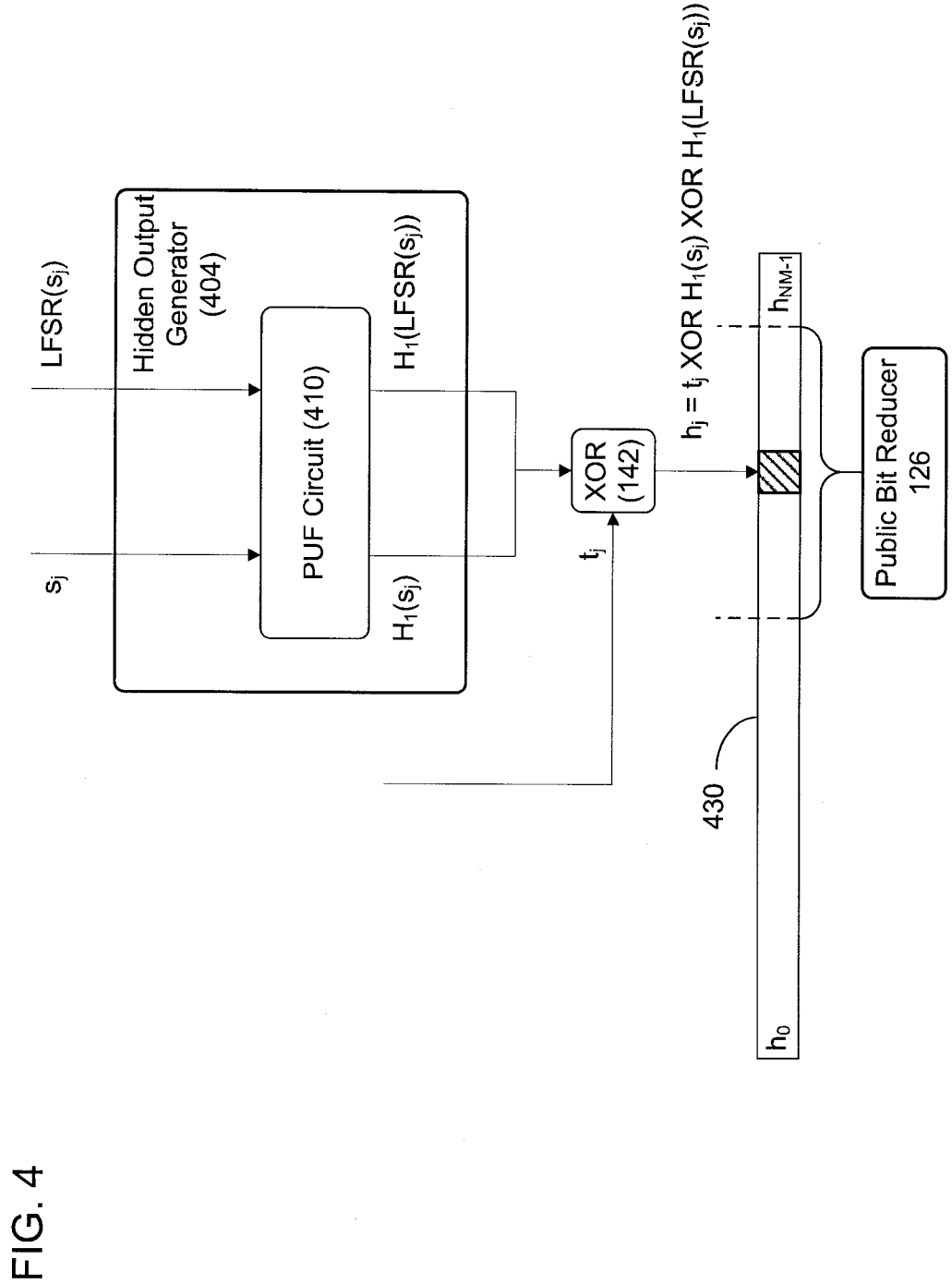
FIG. 4 is a block diagram of another embodiment of a hidden output generator.

Referring to FIG. 4, another embodiment of a hidden output generator 404 is implemented with a single PUF circuit 410. PUF circuit 410 accepts a first challenge input $s_j$ and generates a first output $H_1(s_j)$ in response. PUF circuit 410 then accepts a second challenge input $LFSR(s_j)$ and generates a second PUF output $H_1(LFSR(s_j))$. The second challenge is generated in the ePUF tag by operating on the first challenge $s_j$ with a linear feedback shift register (LFSR; see below for a discussion of the implementation of the LFSR). In general, the first challenge $s_j$ acts as a seed value to the LFSR, and the second challenge $LFSR(s_j)$ represents the output state of the LFSR after one clock from an initial state $s_j$. The two PUF outputs $H_1(s_j)$ and $H_1(LFSR(s_j))$ are three-way XORed with the corresponding polarity bit $t_j$ by XOR circuitry 142. The result forms one component of a hidden output sequence 430 (i.e., $h_j = t_j$ XOR $H_1(s_j)$ XOR $H_1(LFSR(s_j))$) which is operated on by public bit reducer 126 as described above.

An ePUF tag employing hidden output generator 404 may be susceptible to a chaining attack that can "remove" the XOR that operates on the two PUF outputs. An adversary attacking the tag is able to control a value C sent to PUF circuit 310. Although LFSR(C) is determined by circuitry on the ePUF tag, the adversary knows that LFSR(C)=D. The adversary thus can apply D and obtain $H_1(D)$ XOR $H_1(LFSR(D))$. If LFSR(D)=E, then the adversary can also obtain $H_1(E)$ XOR $H_1(LFSR(E))$, and so on. Thus, with a correct guess of C, and knowing the result of the XOR operations performed by hidden output generator 304, the adversary may be able to determine the values of the other PUF outputs (e.g., $H_1(D)$, $H_1(E)$, etc.). To avoid the threat of such a chaining attack, an alternative embodiment of an ePUF tag 200 is described below with reference to FIG. 2.

2 Provisioning

Prior to the deployment of ePUF tag 100, an authority, which is an initial party that establishes the authenticity of the ePUF tag and/or the authenticity of a product to which the tag is affixed, provisions (i.e., enrolls) the ePUF tag. During provisioning, the authority securely obtains and encrypts information that will subsequently be used for authentication of the tag. In some embodiments, the authority is the same party as the manufacturer of the tag.

Figure 5:
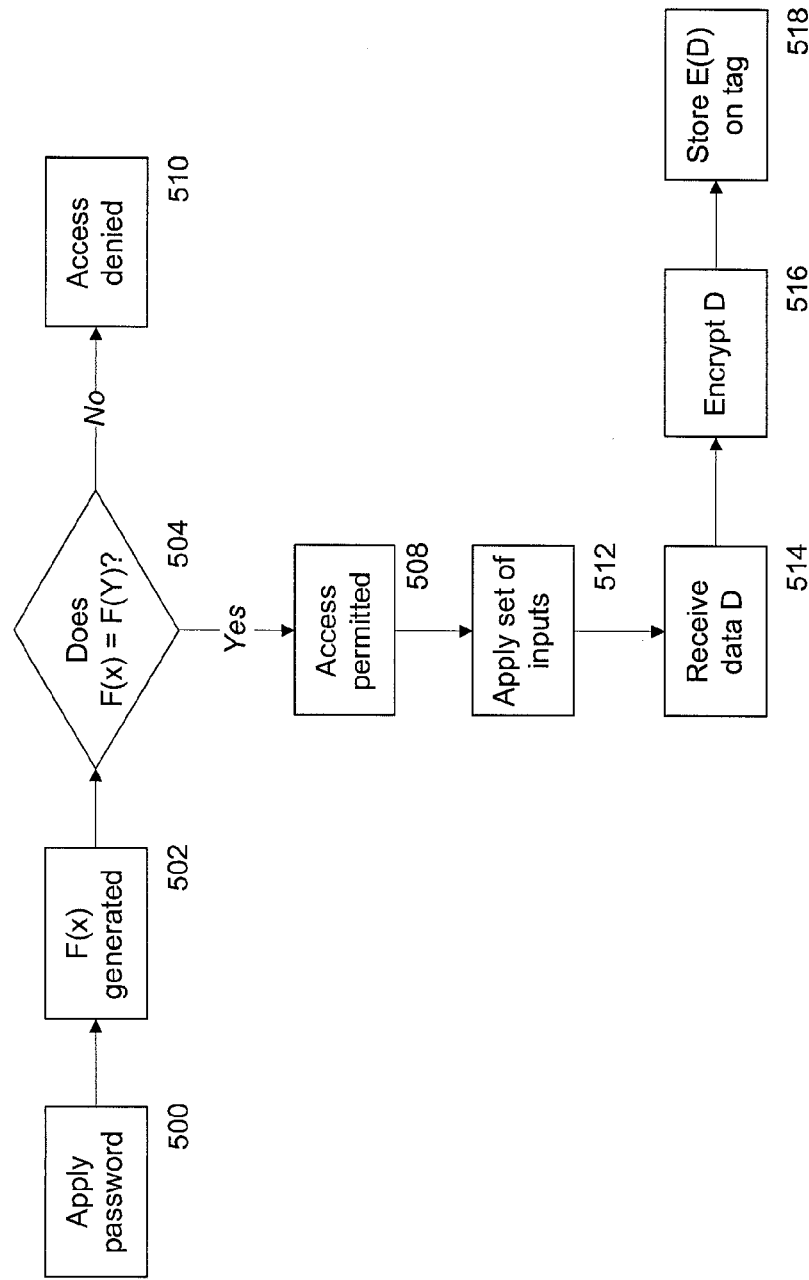
FIG. 5 is a flow chart of the provisioning process.

Referring to FIGS. 1 and 5, during provisioning of a particular tag, the input-output characteristics of hidden output generator 104 on that tag are determined by the initial party. To prevent other unauthorized parties from similarly determining these characteristics, the authority provisioning ePUF tag 100 must apply a correct password x 112 to access circuitry 138 on the ePUF tag, for instance, through RFID interface 150 (step 500). Password 112 is, e.g., a 256 bit value or a 512 bit value. Password 112 sends a state machine, such as a one-way function 114 built into the silicon of ePUF tag 100, into a state F(x) (step 502). Access circuitry 138 includes a register 116 that stores a value F(Y) previously determined according to the fabrication mask of tag 100 or set in an earlier provisioning stage. If the value of the computed F(x) is the same as the value of F(Y) (step 504), the inquiring party is established as a legitimate entity allowed to provision ePUF tag 100. A logic signal is then enabled by an access module 140, allowing the inquiring party to access the input-output characteristics D 120 of hidden output generator 104 (step 508). If the values of F(x) and F(Y) do not match, the inquiring party is not permitted to provision the ePUF tag (step 510). It should be noted that, provided the value Y remains secret, mask copying is ineffective as an attack on ePUF tag 100. For instance, even if F(Y) is discovered by an adversary, the function F( ) makes it virtually impossible to find an X such that F(X)=F(Y).

In some embodiments, the one-way function 114 implements a relatively inexpensive computation (e.g., computationally inexpensive and/or inexpensive in circuit layout area, or in terms of power requirements) by taking advantage of the difficulty of the finite state machine (FSM) reachability problem. The requirements for the one-way function 114 are less stringent than those for one-way hash function used in some other applications. In particular, the one-way function 114 implements a function F(x) for which it is difficult to determine Y for one given F(Y); that is, the security of access circuitry 138 is maintained even if the value F(Y) is public. Note that the function F(Z) is not necessarily difficult to invert for other values of Z; other outputs F(Z) of the one-way function 114 may be easy to invert to determine Z. Furthermore, because hash function 114 is used only to operate on one value (Y), or a relatively small fraction of the possible values in the domain of the function, there is no requirement that the one-way function 114 avoid collisions in the range of the function.

Figure 8:
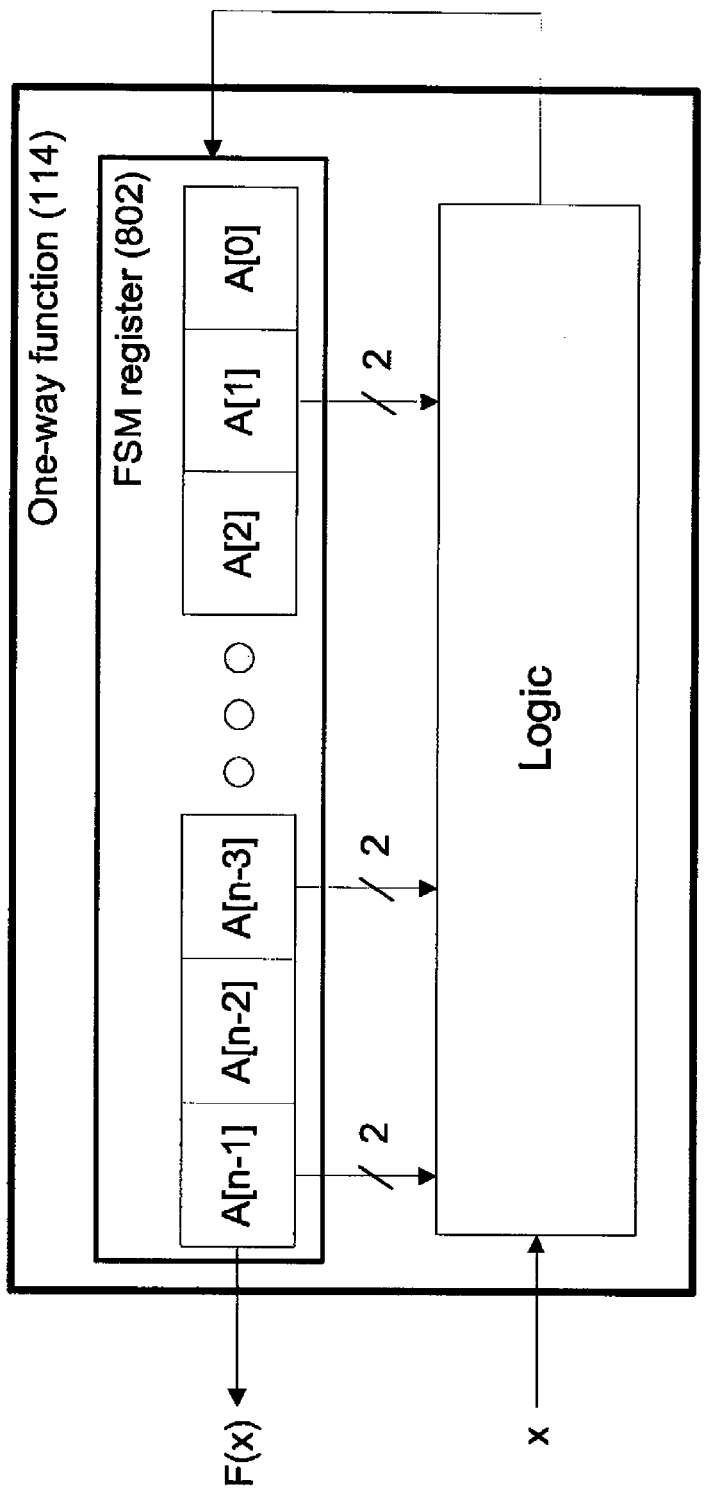
FIG. 8 is a block diagram of a shift register.

Referring to FIG. 8, in one implementation, the password x 112 is applied to an embodiment of the one-way function 114. Each bit of password x 112 is used to move an FSM register 802, such as a 128-bit or 256-bit register, from state to state. FSM register 802 operates on 2-bit pairs of values A[i]. The outputs from FSM register 802 are fed into a combinatorial logic module 804 which performs non-linear logic operations on selected A[k], such as a bit-wise XOR of the bits of A[k] or swaps of the two bits in A[k]. The output of combinatorial logic module 804 is shifted into to FSM register 802, which ultimately outputs the result F(x) of hash function 114. In some embodiments, embodiment of the one-way function 114 shares circuitry with an embodiment of a linear feedback shift register (LFSR) of a challenge generator 134 in order to conserve space on ePUF tag 100. For instance, the FSM register 802, which consumes significant circuit area, is also used to implement the LFSR in the challenge generator 134. Note also that an implementation of the one-way function described above can be significantly more efficient that use of cryptographic techniques, such as requiring a party to provide a private key that matches a public keep stored on the device.

The provisioning process includes an enrollment phase in which the authority applies stimuli 118 to an input of ePUF tag 100 (e.g., through RFID interface 150) to cause a comprehensive set of index inputs to be provided to hidden output generator 104 (step 512). PUF outputs $H(s_j)$ corresponding to the set of index inputs are generated by the hidden output generator and collectively provided to the provisioning authority as data D (step 514). A "comprehensive" set of inputs is such that sufficient data D is provided to the authority so as to allow the authority to predict the output of hidden output generator 104 for any possible input. For instance, in the embodiment in which the bit expansion logic 106 of hidden output generator 104 is based on a challenge table, every challenge in the challenge table is provided to PUF circuit 110 during the enrollment phase. The order in which the challenges are provided is unimportant. In some examples, the input-output characteristics of hidden output generator 104 are provided as a vector with values equal to the PUF outputs for index inputs 0 through $2^n-1$ (i.e., D= (H(0), . . . , H($2^n$−1))). For instance, for a hidden output generator that accepts a 9-bit input and generates a 1-bit PUF output for each challenge, D 120 is represented as a 512 bit vector (D=(H(0), . . . , H($2^9$−1)). In other embodiments, D 120 includes 128 bits of PUF outputs.

Note that the use of the one-way function F(X) prevents disclosure of the PUF characteristics to unauthorized parties, without requiring non-invertible locking techniques, such as severing of physical links (e.g., fuses). Furthermore, this approach may be more secure that using write-once registers which are set after the PUF characteristics are read out in that an attach that physically erases the register values (e.g., with optical, magnetic, or radio frequency signals) are not effective against the one-way function approach. Furthermore, a party that knows the password (X) can delegate the authority to read the PUF characteristics to another party, and authorized parties can perform the enrollment function multiple times with the same device.

The authority receives data D 120 from ePUF tag 100 and uses any of a number of conventional encryption techniques to generate encrypted data E(D) 122 from data D 120 (step 516). The authority uses information associated with ePUF tag 100 and stored in the tag identifier memory 102 to selectively identify an encryption key with which to encrypt data D 120. The authority then transmits the encrypted data E(D) 122 to ePUF tag 100 for storage in a PUF database 124 (step 518). PUF database 124 is generally capable of storing 512 or 1024 bits of encrypted data. Once E(D) 122 is stored in PUF database 124, the enrollment phase terminates.

In embodiments in which the hidden output generator includes two or more PUF circuits, the above provisioning procedure applies to each PUF circuit. For instance, in the case of two PUF circuits, a comprehensive set of inputs is applied to each PUF circuit such that sufficient data $D_1$ from the first PUF circuit and data $D_2$ from the second PUf circuit are provided to the authority. The authority is then able to predict the PUF output for any possible input. The data $D_1$ and $D_2$ are encrypted by the authority and stored in PUF database 124 as described above.

In some embodiments, the provisioning procedure is valid only once. Once the security circuitry has been "unlocked" by the application of a correct password 112, an arbitrary number of challenges may be entered. While entering a challenge into the ePUF tag before extracting data from the tag is optional, not doing so limits the data extraction sequence to a constant seed. In some embodiments, the provisioning function of the ePUF tag can be externally disabled.

In some cases, the provisioning authority provides stimuli 118 and receives data D 120 via RFID interface 150. In other cases, to enable more rapid provisioning, the provisioning authority bypasses the RFID interface 150, instead providing stimuli 118 and/or receiving data D 120 via direct electrical contact at an input electrical pad 166 and an output electrical pad 162, respectively.

ePUF tag 100 is powered by a power module 168 that receives power via RFID interface 150. In some examples, even if electrical pad input/output is used, the ePUF is powered by RF signals during provisioning rather than providing power through electrical pads. Such RF powering may be preferable to as it would not require additional circuitry and/or electrical pads for providing power. Due to the relatively small amount of energy that may be stored per RF excitation in some implementations and the relatively large amount of data that may need to be read out during provisioning, multiple iterations of RF excitation may be necessary when provisioning a single ePUF, with different parts of the provisioning output being provided in each iteration. Use of multiple RF excitations is particularly useful if RF output is used to transfer the provisioning output from the ePUF, because the RF output generally requires more time and/or power than providing the outputs over electrical pads.

3 Authentication

At some point in time after ePUF tag 100 has been enrolled as described above and after the tag has been out of the custody of the authority or another trusted party, ePUF tag 100 is authenticated by an authentication station (such as a portable RFID reader) in an authentication phase. The ePUF tag 100 responds to radio frequency signals from an RFID reader by providing its tag identifier, stored in tag identifier memory 102, and encrypted data E(D) 122, stored in PUF database 124, to the reader. The RFID reader uses information included in the tag identifier to selectively identify a decryption key with which to decrypt E(D). The decrypted data D is stored in a memory that is accessible by the RFID reader for the duration of the authentication phase and then securely discarded. The ePUF tag is authenticated by comparing the data D with responses generated by the tag at the time of authentication.

3.1 Index Generation

Referring again to the embodiment shown in FIG. 1, authentication of ePUF tag 100 makes use of repeated operation of hidden output generator 104 according to a sequence of index values $s_j$, with one hidden output $h_j$ being generated for each index value in the sequence, as described above. The index values are generated by security circuitry 152 on ePUF tag 100 based on a first randomly generated nonce S received from the RFID reader and a second randomly generated nonce Q generated by the ePUF tag itself. That is, neither the tag nor the reader alone is capable of constraining the choice of index sequence that is applied to the hidden output generator.

Referring to FIGS. 1 and 6, once the RFID reader has decrypted the data E(D) to obtain data D, the reader sends a randomly generated 64-bit nonce S 132 to the tag (step 600). Receipt of the nonce S triggers a challenge generator 134 to perform a number of actions involving linear feedback shift registers A (LFSR_A) and linear feedback shift registers B (LFSR_B) on the tag. LFSR_A is a dual-polynomial LFSR (i.e., LFSR_A0 and LFSR_A1) implemented to correspond to two different degree 64 primitive polynomials in the characteristic 2 domain.

The shared LFSR_A, operating in random number generation mode, first generates a 64-bit non-deterministic random number Q 133 (step 602). In one implementation, Q is determined as follows:

a. LFSR_A is loaded with initial state 0 (64 bits)
b. LFSR_A is set to operate in random number generation mode
c. During the first crank of the random number generation phase, LFSR_A feeds its 64-bit state directly to PUF circuit 110
d. The output of PUF circuit 110 functions as a polynomial selector signal that selectively switches the state of LFSR_A between the values represented by LFSR_A0 and LFSR_A1 as LFSR_A is iteratively cranked 512 times
e. The state of LFSR_A after the $512^{th}$ crank defines the 64-bit non-deterministic random number Q With S and Q loaded in LFSR_A and LFSR_B, respectively, LFSR_A and LFSR_B are rotated 64 times as a 128-bit circular shift register. The state of LFSR_B after the $64^{th}$ rotation defines the 64-bit tag-generated Q, which is then stored in a memory of the tag. LFSR_A and LFSR_B are further rotated an additional 32 times as a 128-bit shift register so that half of S and half of Q are loaded in each LFSR. For instance, LFSR_A is loaded with S[61:31], Q[63:32] and LFSR_is loaded with S[b 30:0], Q[31:0].

The value of Q is sent back to the RFID reader (step 604) so that both the reader and ePUF tag 100 know the initial states of LFSR_A and LFSR_B. With the initial states of the shift registers, and given that the generator polynomials of the shift registers are known by the reader, the reader can generate a sequence of states that is identical to the sequence of states generated by the LFSRs on ePUF tag 100.

With the two LFSRs loaded with their initial states based on S and Q, ePUF tag 100 then generates the sequential challenges $s_j$ to be applied to hidden output generator 104 (step 606). Specifically, each clock of the LFSRs generates a 16-bit index register value. An index register 136 designates n bits (e.g., 9 bits) of each index register value as an outer challenge to be provided as the input $s_j$ to hidden output generator 104. Index register 136 also designates one bit of the index register value (e.g., the least significant bit) as a polarity bit $t_j$ to be combined with the output $H(s_j)$ of hidden output generator 104, as discussed in greater detail below.

In some cases, an adversary may be able to attack an ePUF tag with LFSRs configured to generate a sequence $s_1, s_2, \ldots, s_m, s_{m+1}, \ldots, s_{2m}$, etc. That is, for a state $x_i$ of the LFSR ($s_i = s(x_i)$), the LFSR is configured such that $s_{i+1} = LFSR(s_i)$. In such instances, a subset of the sequence generated by the LFSRs (e.g., $S_1, \ldots, s_m$) is used as the n-bit index $s_j$ input to the hidden output generator. Hidden outputs $H(s_1, \ldots, s_m)$, $H(s_{m+1}, \ldots, s_{2m})$, ... are then generated by the hidden output generator. In an attack, an adversary may apply seed values S' and Q' to cause the LFSRs to generate an output sequence $s_1'$, $s_2', \ldots$, where $S_1' = s_2$, $s_2' = s_3$, etc. The adversary may then be able to use this shifted sequence of challenges to expose the H( ) function of the hidden output generator by causing the hidden output generator to generated PUF outputs $H(s_2, \ldots, s_{m+1})$, $H(s_{m+2}, \ldots, s_{2m+1})$, etc.

To avoid this type of attack, the LFSR may be configured to generate subsequences of length m, e.g., such that $x_{(i+1)m} = LFSR\_A(x_{im})$ and $x_{j+1} = LFSR\_B(x_{jm})$, where $j = (i+1)m, \ldots, (i+1)m+m-1$, etc. With this configuration, an adversary cannot cause the LFSRs to generate a shifted sequence and thus cannot expose the H( ) function of the hidden output generator. At most, the adversary may be able to learn the function of the hidden output generator related to one subsequence of length m.

3.2 Bit Reduction and Response Generation

Hidden output generator 104 receives the sequence of n-bit challenges $s_j$ and, for each challenge, generates a hidden output $h_j$, as described above. The resulting hidden output sequence 130 is operated on by public bit reducer 126 to generate a response sequence R' 128. The response sequence R' is output from ePUF tag during the authentication phase via RFID interface 150. The foregoing description applies equally to the other embodiments of the hidden output generator as described above.

In general, each response part of an N-part response sequence R' 128 is based on M=4m+2 hidden outputs in hidden output sequence 130, where m is a positive integer. Thus, to generate an N-part response R', hidden output generator 104 generates N*M hidden outputs $h_j$. For instance, for m=2, M=10 hidden outputs are generated for each response part, or 1280 hidden outputs are generated to determine an N=128-part response sequence R'. As another example, a 64-bit response sequence is determined by the application of 640 index values $s_j$ to hidden output generator 104, where each successive sequence of 10 hidden bits in hidden output sequence 130 is used as input to the bit reduction function to yield one bit of the 64-bit response.

In some embodiments, adjacent groups of M hidden outputs are used to generate each response part. In other embodiments, non-contiguous groups of M hidden outputs are used to generate each response part. For instance, public bit reducer 126 may implement a random offset between a first group of M hidden outputs used to generate a first response part of the response sequence and a second group of M hidden outputs used to generate a second response part.

Referring to FIG. 7, the process of response generation can be summarized as follows (not necessarily corresponding to the order in which these steps are performed in the RFID reader or in the ePUF tag) in the case that each of N response parts is determined from M hidden bits:

a. Obtain S, Q (700)
b. Determine an index sequence $s_0, \ldots, s_{NM-1}$ (702) and a polarity bit sequence $t_0, \ldots, t_{NM-1}$ (704) based on S and Q
c. Determine a hidden output $H(s_k)$ associated with each index $s_k$ (706)
d. Determine a hidden output sequence $h_0, \ldots, h_{NM-1}$, where $h_k = t_k \oplus H(s_k)$ (708)
e. Determine a response sequence $r_0, \ldots, r_{NM-1}$ such that $r_j = R_{jM}(h_{jM+1}, \ldots, h_{(j+1)M-1})$, where R( ) is the public bit reduction function. (710)

In general, the public bit reduction function R( ) is a non-linear function of the hidden output sequence. By non-linear, we exclude functions that are linear over domains such as modulo 2, such as XOR functions. For instance, the public bit reduction function may be an index function (e.g., an index of the greatest $H_i$ when the hidden output $H(s_j)$ is multi-valued), a voting function, a counts function, or another nonlinear combination of the hidden outputs h, or PUF outputs $H(s_j)$ produced by the hidden output generator.

For instance, in some embodiments, the public bit reduction function R( ) is implemented with majority voting logic. Every 2m+1 iterations, voting logic in public bit reducer 126 applies majority voting logic on the previously generated 2m+1 hidden outputs, producing a 0 if m or fewer of the 2m+1 hidden outputs are ones and a 1 otherwise. Every 4m+2 iterations, the public bit reducer 126 XORs the previous two outputs of the majority voting logic to produce one response part of response sequence R' 128. The response part is thus based on the values of the previously generated 4m+2 hidden outputs. The majority voting process is performed iteratively for (2m+2)*N iterations to generate an N-part response R' defined by an ordered sequence of the response parts.

In other embodiments, the public bit reduction function is implemented using count-ones circuitry. In this case, one response part of response sequence R' 128 is generated for each set of 4m+2 hidden outputs. The bit reduction function determines the number of "ones" in the 4m+2 hidden outputs; if the number of ones is greater than a threshold (e.g., if there are more than 2m+1 ones), then the bit reduction function produces a 1; otherwise, it produces a 0.

ePUF tag 100 maintains the secrecy of the PUF function $H(s_j)$. Even if an adverse party were to discover a large number of tuples $\{r, (s_0, s_1, \ldots s_{M-1}), (t_0, t_1, \ldots t_{M-1})\}$, an appropriate selection of the bit reduction function R( ) inhibits discovery of H( ). Although there may be relatively few possible index inputs $s_j$ to the hidden output function, there are many M-long sequences of indices $s_j$. For example, with 512 different index values $s_j$ and M=10, there are $512^{10}$ different possible sequences. In general, it is not expected that any particular sequence of indices will be repeated for a particular tag.

3.3 Authentication

Each authentication attempt makes use of a random selection of the sequence of indices $s_j$ applied to hidden output generator. As discussed above, the selection of the nonce S by the reader and the nonce Q by the ePUF tag itself ensures that neither the tag nor the reader alone can constrain the index sequence applied to the hidden output generator during authentication.

The RFID reader uses its knowledge of the 64-bit nonce S and the tag-returned 64-bit nonce Q to effectively simulate the operation of ePUF tag 100, using the decrypted response data D 120 rather than the physical hidden output generator to obtain an anticipated response R. The received response R', generated by ePUF tag 100 as described above, is compared to the anticipated response R to verify that the received response was generated by an ePUF tag whose hidden output generator has input-output characteristics corresponding to D. If R' and R match, then ePUF tag 100 is authenticated.

Figure 9:
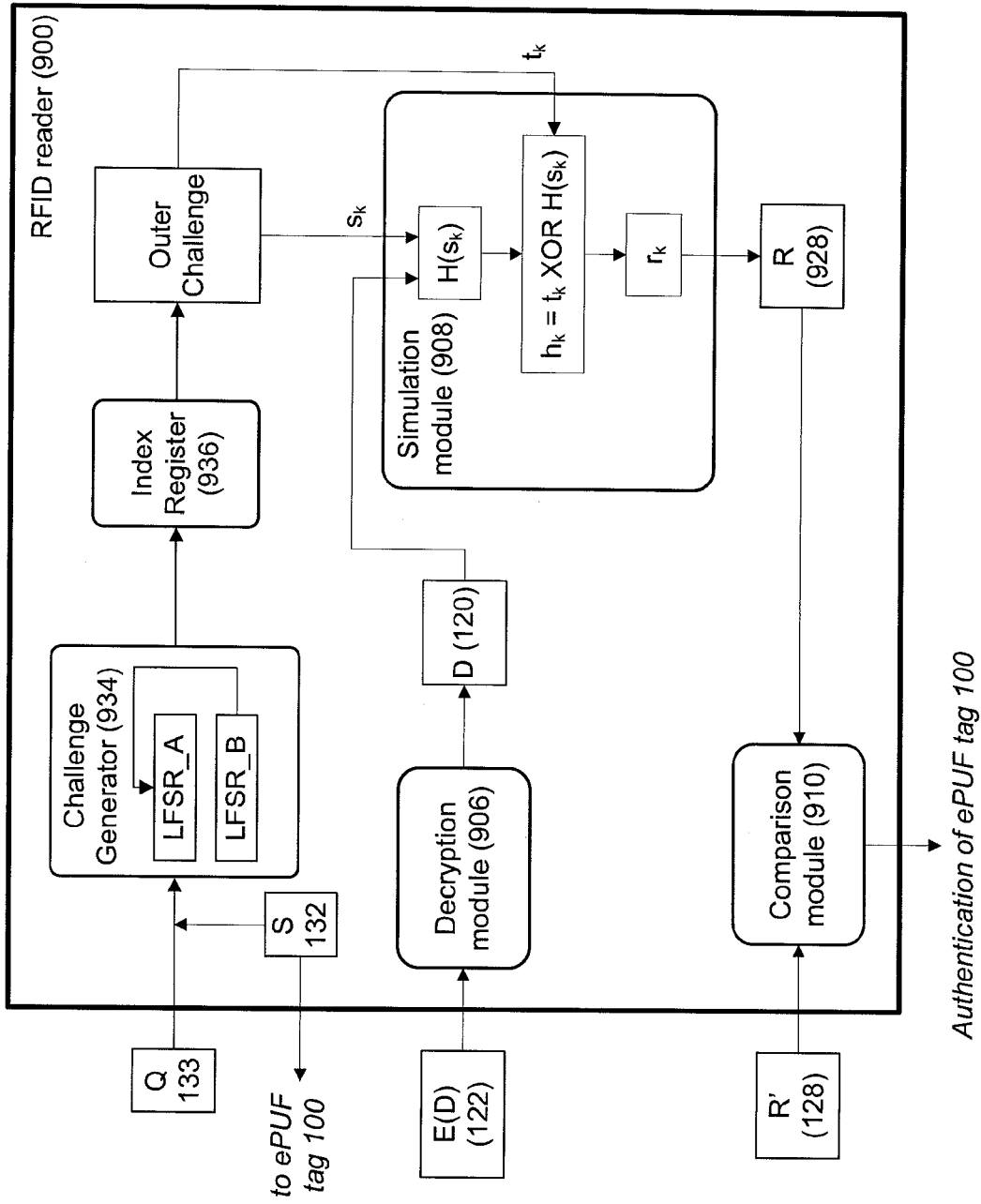
FIG. 9 is a block diagram of an RFID reader.

More specifically, referring to FIG. 9, an RFID reader 900 generates the nonce S 132 and receives the nonce Q 133 from the ePUF tag. The values S and Q are used as seed values for a challenge generator 934 including a set of LFSRs 904. LFSRs 904 are configured to behave identically to the LFSRs of the challenge generator 134 on ePUF tag 100 (see FIG. 1). The output of challenge generator 934 is received by an index register 136, which generates an outer challenge. Based on the outer challenge, thus RFID reader 900 generates the same index sequence $s_0, \ldots, s_{NM-1}$ and the same polarity bit sequence $t_0, \ldots, t_{NM-1}$ generated by the ePUF tag.

RFID reader 900 retrieves the encrypted response data E(D) 122 from the ePUF tag and decrypts the data in a decryption module 906 to obtain the response data D 120. As discussed above, response data D 120 includes a comprehensive set of data such that the reader 900 is able to simulate the output of the hidden output generator of the ePUF tag for any possible input. For instance, D may be provided as a bit vector with values equal to the PUF outputs for index inputs 0 through $2^n-1$ (i.e., $D=(H(0), \ldots, H(2^n-1))$).

As an alternative to D including a comprehensive set of responses for any possible challenge by all PUFs on the device, a series of $(s_i, H(s_i))$ pairs are received from the ePUF during provisioning, and the provisioning device determines D to represent model parameters from which a response $\hat{H}(s_j)$ can be predicted for any $s_j$, even if that challenge or index is not used during provisioning. The model attempts to match the provisioning data, but an exact match is not necessarily required because during authentication, different challenges will be used and in a number of implementation, an exact match to the model is not required to authenticate the ePUF.

In the model based approach the reader receives the series of $(s_i, H(s_i))$ challenge-response pairs from the ePUF. In some embodiments, the series of challenges are determined on the device, for example, based on a seed provided from the reader and then generated using an LFSR on the ePUF. In some embodiments, the desired challenges are provided from the reader, and in other embodiments, the challenges are generated entirely on the ePUF, for example, based on a random selection. The authenticating entity, for instance implemented in the reader, then estimates the model parameters D that best match the received challenge response pairs. A variety of estimation procedures may be used, including as examples, Maximum Likelihood estimation of the parameters and iterative optimization approaches.

In embodiments in which the PUFs on the ePUF are implemented using delay lines with selectable sections as described in U.S. Patent Publication US2003/0204743A1, which is incorporated herein by reference, the model parameters represent the relative delay of introduced between the outputs each stage of the delay PUF depending of whether the corresponding challenge bit is 0 or 1. One approach to estimating these relative delay parameters is to initialize the parameters with random quantities, and then iterate through the received challenge-response pairs and reinforcing the relative delays when the modeled response matches the received response, and depreciating the relative delays when the modeled response does not match.

During authentication, the reader receives E(D), and uses the model parameters to predict the PUF outputs (i.e., simulate the operation of the hidden PUFs on the device) to the challenge values applied internally in a hidden manner to the PUFs on the ePUF. Note that without access to the raw PUF outputs before their combination on the ePUF, an adversary cannot effectively estimate the model parameters D from the information that is output from the ePUF.

Using the index sequence generated by challenge generator 902 and the model of the PUF, a simulation module 908 determines a simulated PUF output $H(s_k)$ associated with each index $s_k$ applied to the hidden bit generator. The simulation module 908 then determines a simulated hidden output sequence $h_0, \ldots, h_{NM-1}$, where $h_k = t_k \oplus H(s_k)$. RFID reader 900 also knows the public bit reduction function of the ePUF tag, and thus the simulation module is able to determine a simulated response sequence R 928 by operating on the hidden output sequence with the public bit reduction function. A comparison module 910 compares the simulated response sequence R 928 with the response R' 128 received from the ePUF tag to authenticate the tag.

While an exact match between R and R' is ideal, some allotment is made for bit-errors up to a predetermined threshold. If the response R' matches R with fewer bit-errors than the threshold, it is considered sufficiently similar for authentication of ePUF tag 100. If R's is not sufficiently similar to R, the ePUF tag may be rejected, additional challenges may be issued, or other verification procedures may be invoked. In some embodiments, there is a distinct different between an invalid response (e.g., roughly 64 erroneous bits out of a 128-bit response) and a valid response (e.g., roughly 12 to 16 erroneous bits in a 128-bit response). Probabilities for false positive authentications (identifying an imposter device as an authentic) and false negative authentications (rejecting a valid device) can be balanced by setting the appropriate authentication code distance threshold. Other methods of determining sufficient similarity, such as weighting different bit errors differently, are also possible.

To further strengthen the security of ePUF tag 100, in some examples, each tag includes a counter that is incremented after the generation of each response part or response sequence. After the generation of a predetermined maximum number of response parts, no further response is permitted to be transmitted from the ePUF tag. The limit of the counter can be set sufficiently high so as to allow a reasonable lifetime of authentications of the tag while still preventing a large number repeated authentications from providing enough data to allow an adversary to develop an approximate estimation of the hidden output function.

In some instances, the last 512 bits of PUF database 124 are used as the counter. These 512 bits are initially set to zero during the provisioning phase; for each use of the chip, one of the bits is set to one. Once all 512 bits are set to one, the tag no longer responds. The ePUF tag can be configured to limit its use to less than 512 uses by setting some of the 512 bits to one during provisioning; alternatively, the tag can also be configured to ignore the use counter and provide unlimited uses.

4 Alternative Embodiment

Figure 2:
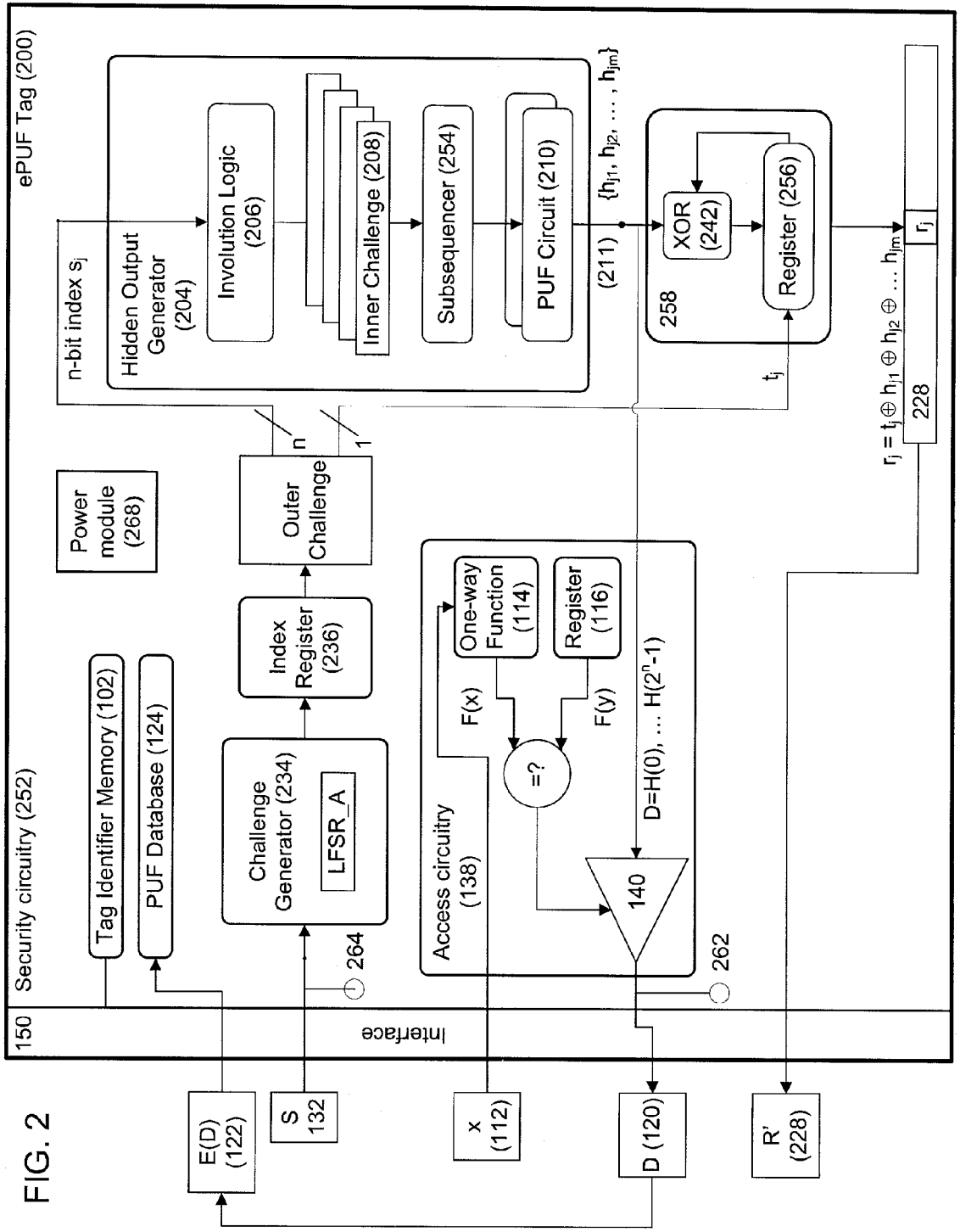
FIG. 2 is a block diagram of a second embodiment of an ePUF RFID tag.

Referring to FIG. 2, in an alternative embodiment, an ePUF tag 200 includes a challenge generator 234 including a single LFSR. A seed S 232 received from an RFID reader establishes the initial state of the LFSR. Each clock of the LFSR generates a 16-bit index register value. An index register 236 designates n bits (e.g., 9 bits) of each index register value as an outer challenge to be provided as an input sj to a hidden output generator 204. Index register 236 also designates one bit of the index register value (e.g., the least significant bit) as a polarity bit tj.

Hidden output generator 204 includes involution logic 206 that receives the n-bit index $s_j$ and generates a tuple of inner challenges 208 $(s_i, \pi_1(s_i), \pi_2(s_i), \ldots, \pi_{M-1}(s_i))$. Inner challenges 208 are received by a subsequencer 254 which selects combinations of the inner challenges to be input to a set of of PUF circuits 210. For example, a set of M=8 inner challenges are generated, and two PUF circuits 210 produce a series of hidden outputs $\{h_{j1}, h_{j2}, \ldots, h_{jM}\}$ in response to the applied combinations of inner challenges 208 in a series of four applications of inner challenges to the PUFs. In general, each PUF is used multiple times for each index to produce corresponding multiple hidden outputs. The functions $\pi_m(s)$ are chosen such that repeated application returns the original value: $\pi_m(\pi_m(s))=s$. An example of such a function is a permutation in which values at pairs of bit positions are exchanged. With such a bit expansion approach, each PUF will receive a set of inner challenges that are all permutations of the index. One property of these permutations is that each index is a member of a finite set of permutations if its bits (i.e., the permutation group generated by the permutations $\pi_m(\ )$ and regardless of which member of that set is presented as the index to the bit expansion logic, the inner challenges are all members of that same set. In other embodiments, the functions $\pi_m(\ )$ are not necessarily permutations of the bits of the index, but maintain the property that they define a partition of the index space into relatively small part such that application of the functions to any index in one of the parts results in transformed values that remain in that part.

The hidden outputs $\{h_{j1}, h_{j2}, \ldots, h_{jm}\}$ are received by a bit reduction module 258 containing XOR circuitry 242 and a register 256. The m hidden outputs and the polarity bit $t_j$ corresponding to the challenge $s_j$ input into hidden bit generator 204 are (m+1)-way XORed by XOR circuitry 242. Register 256 returns the appropriate value to the XOR circuitry to enable the (m+1)-way XOR (i.e., register 256 returns the partial result $t_j$ XOR $h_{j1}$ for subsequent XORing with $h_{j2}$). The output of bit reduction module 258 ($t_j$ XOR $h_{j1}$ XOR $h_{j2}$ XOR . . . $h_{jm}$) forms one response bit $r_j$ of response sequence R' 228, which is provided via RFID interface 150 during authentication.

During provisioning of ePUF tag 200, a provisioning authority, such as an RFID reader, provides a seed S 232 to challenge generator 234. Challenge generator 234 then drives the generation of a series of index values $s_j$ to be used for enrollment of the ePUF tag. If the provisioning authority provides a proper password x 112 to access circuitry 138, as discussed above in conjunction with FIG. 1, the hidden outputs $\{h_{j1}, h_{j2}, \ldots, h_{jm}\}$ from hidden bit generator 204 are provided by ePUF tag 200 as data D 120. The provisioning authority receives data D 120 and uses any of a number of conventional encryption techniques to generated encrypted data E(D) 122 from data D 120. The authority uses information associated with ePUF tag 200 and stored in the tag identifier memory 102 to selectively identify an encryption key with which to encrypt data D 120. The encryption key is known to the provisioning authority but not to the ePUF tag 200. The authority then transmits the encrypted data E(D) 122 to ePUF tag 200 for storage in PUF database 124. PUF database 124 is generally capable of storing 512 or 1024 bits of encrypted data. Once E(D) 122 is stored in PUF database 124, the provisioning phase terminates.

In some cases, the provisioning authority provides seed S 232 and receives data D 120 via RFID interface 150. In other cases, to enable more rapid provisioning, the provisioning authority bypasses the RFID interface 150, instead providing seed S 232 and/or receiving data D 120 via direct electrical contact at an input electrical pad 264 and an output electrical pad 262, respectively.

ePUF tag 100 is powered by a power module 168 that receives power via RFID interface 150. In some cases, the quantity of stimuli 118 applied to and/or data D 120 received from ePUF tag 100 is high enough that multiple power cycles are used during provisioning of the tag.

Involution logic 206 helps to make ePUF tag 200 robust against the threat of a chaining attack such as that described above with respect to FIG. 4. The involution strategy implemented by involution logic 206 prevents the formation of chains of outputs from hidden bit generator 204; an adversary can at most form loops of length two. That is, even if an adversary applies $\pi(c)$ to PUF circuits 210, the most information that can be obtained from hidden bit generator 204 is $\pi(\pi(c))$, or c itself.

In some instances, the involution strategy implemented by ePUF tag 200 is generalized to obtain 4-way or 8-way XORs from a single PUF circuit. In other instances, two PUF circuits are used to obtain 8-way or 16-way XORs. That is, two, four, or eight challenges are input to the PUF circuit(s) per authentication output. In general, the larger the number of XORed bits, the more robust is the ePUF tag against attack.

5 Other Implementations

The techniques described above can be used in combination with the systems described in U.S. Pat. No. 7,564,345, "Volatile Device Keys and Applications Thereof," issued Jul. 21, 2009, the contents of which are incorporated herein by reference. For example, these techniques may be used to authenticate devices other than proximity devices. While these techniques are described in terms of RFIDs and RFID readers, it is useful to note that other devices (including proximity devices and readers) can also make use of these techniques. Examples include Bluetooth enabled devices that use PUF circuits to verify a connection; portable media devices that use PUF circuits to verify the device, e.g., when downloading media to the device; cell phones that use PUF circuits to verify the phone when connecting to the network. Additionally, RFIDs are seen in a variety of contexts, including use in counterfeit-proofing goods (e.g., medications, electronics, or designer bags) and carrying personal information (e.g., security badges, mass-transit passes, or passports). As RFIDs become more prevalent, RFID readers also become more prevalent. For example, cell phones can be built to include an RFID reader so that the cell phone can be used to authenticate an RFID by communicating with the central authority. Different techniques are suitable for different circumstances.

In other embodiments, different bit reduction functions can be used. Some examples include dividing sequences of the hidden outputs into more than two groups, and applying a voting function to each of the groups. In some example, each group of voted hidden outputs is not necessarily the same. In some examples, the bit reduction function is implemented as or using a lookup table. In some examples, the hidden output sequence is not necessarily partitioned into sections that are independently passed through a bit reduction function. However, in some such examples, the overall reduction from the hidden output sequence to the response sequence is such that a change of a small number of outputs in the hidden output sequence (e.g., as a result of the non-repeatability of the exact hidden output function) results in a limited number of parts of the response sequence changing. In the example above using voting in sections of M hidden outputs, each change of a hidden output only affects one response part of the response. In other examples, a change in one hidden output may change more than one response part, but the overall effect is limited so that authentication is still possible with a modest rate of changes in the hidden output function between the provisioning time and the authentication time.

In some examples, the encrypted data D is not necessarily stored on the tag itself. These approaches can be applied in cases in which the data D is provided from the provisioning authority to the reader by another channel, for example, via a network, using a database lookup, or via a secure transmission such as on a recorded medium that accompanies a shipment of tags.

In some examples, the hidden output generator may be implemented using a one time programmable (OTP) memory that is written during provisioning with a secret number (D)

known to the provisioning authority, but that cannot be read out from the tag. The provisioning authority then writes the encrypted number E(D) on the tag in a readable memory. The tag then implements the hidden output function as a lookup of a bit in the number D. In some examples, the OTP memory is written with a random number generated on the tag, and that number is provided to the authentication authority.

In examples in which the hidden output function is implemented using a circuit that exploits fabrication variation, various types of circuits can be used. For example, the hidden output function can apply the index to select a device or circuit and the output corresponds to a characteristic of the device or circuit. For example, the index may select a transistor, and the output may correspond to a threshold level of the transistor. In another example, the index may select a pair of oscillator circuits and the may correspond to a comparison of the oscillation frequencies of the oscillators. In another example, the index may select a pair of delay paths, and the output may correspond to a comparison of signal delay in the two paths.

Examples of the approaches described above can be implemented in hardware, in software, or a combination of hardware of software. For example, an ePUF tag may be implemented using a special purpose integrated circuit and the functionality of the reader implemented in software that executes on a general purpose processor in the reader. Hardware can include custom integrated circuits, or configurable circuits, such as Field Programmable Gate Array (FPGAs). Hardware implementation can be specified according to circuit specification instructions that are stored on computer readable media, for example, in the form of configuration data for FPGAs or in the form of a Hardware Description Language (HDL), such as Verilog. Software implementations can includes instructions, stored on computer readable media, for controlling execution of a general purpose or a special purpose controller or processor. For example, an authentication station may include a general purpose processor that is controlled by a stored program, and a proximity device may include a special purpose control processor that is controlled by instructions that are stored on the device.

It is to be understood that the foregoing description is intended to illustrate and not to limit the scope of the invention, which is defined by the scope of the appended claims. For instance, although the techniques described above are described in the context of an RFID-based application, these techniques are applicable to authentication of other types of integrated circuits.

What is claimed is:

1. An integrated circuit comprising:
   a sequence generator configured to generate a series of challenges;
   a hidden output generator configured to generate a series of hidden outputs, each hidden output a function of a corresponding challenge in the series of challenges;
   access control circuitry for preventing disclosure of the hidden outputs outside of the integrated circuit; and
   bit reduction circuitry configured to generate a response sequence including a plurality of response parts, each response part a function of a corresponding plurality of hidden outputs.

2. The integrated circuit of claim 1, further comprising a nonvolatile memory configured to store encrypted data corresponding to at least one of the series of hidden outputs or parameters derived based on the series of hidden outputs.

3. The integrated circuit of claim 1, wherein the sequence generator is configured to generate the series of challenges on the basis of a first seed inputted into the integrated circuit.

4. The integrated circuit of claim 3, wherein the sequence generator is further configured to generate the series of challenges on the basis of a second seed generated by the integrated circuit.

5. The integrated circuit of claim 1, wherein the sequence generator comprises:
   a first generator configured to generate a series of generator values; and
   an index register configured to select a subset of the bits of each generator value, each subset forming a challenge in the series of challenges.

6. The integrated circuit of claim 5, wherein the first generator includes a linear feedback shift register.

7. The integrated circuit of claim 1, wherein each response part in the response sequence is a nonlinear function of the corresponding plurality of hidden outputs.

8. The integrated circuit of claim 7, wherein each response part in the response sequence is determined on the basis of a number of bits having a value of one in the corresponding plurality of hidden outputs.

9. The integrated circuit of claim 7, wherein the bit reduction circuitry comprises:
   counting circuitry configured to, for each response part in the response sequence, count a first number of bits having a value of one in a first portion of the corresponding plurality of hidden outputs and a second number of bits having a value of one in a second portion of the corresponding plurality of hidden outputs; and
   comparison circuitry configured to compare the first number of bits and the second number of bits,
   wherein the result of the comparison forms the corresponding response part in the response sequence.

10. The integrated circuit of claim 1, wherein the hidden output generator includes physically unclonable function (PUF) circuitry.

11. The integrated circuit of claim 10, wherein the PUF circuitry comprises delay-based PUF circuitry.

12. The integrated circuit of claim 10, wherein the hidden output generator further comprises involution logic configured to apply a plurality of permutation functions to each challenge to generate a corresponding plurality of inner challenges, and
   wherein the hidden output generator is configured to generate a subseries of hidden outputs corresponding to each challenge in the series of challenges, each hidden output in the subseries of hidden outputs generated by application of one of the inner challenges to the PUF circuitry.

13. The integrated circuit of claim 12, further comprising comparison circuitry configured to compare the hidden outputs in the subseries of hidden outputs.

14. The integrated circuit of claim 10, wherein the hidden output generator comprises:
   first PUF circuitry and second PUF circuitry, each PUF circuitry configured to generate a PUF output based on a first challenge in the series of challenges; and
   comparison circuitry configured to compare the PUF output generated by the first PUF circuitry and the PUF output generated by the second PUF circuitry, the result of the comparison forming the hidden output corresponding to the first challenge.

15. The integrated circuit of claim 10, wherein the PUF circuitry is configured to generate a first PUF output based on a first challenge in the series of challenges and to generate a second PUF output based on a second challenge in the series of challenges, and wherein the hidden output generator further comprises comparison circuitry configured to compare the first PUF output and the second PUF output, the result of the comparison forming the hidden output corresponding to the first challenge.

16. The integrated circuit of claim 10, wherein the hidden output generator further comprises bit expansion circuitry configured to generate an inner challenge based on a first challenge in the series of challenges, the inner challenge longer than the first challenge,
wherein the PUF circuitry is configured to generate a PUF output based on the inner challenge.

17. The integrated circuit of claim 16, further comprising comparison circuitry configured to compare each PUF output with a corresponding polarity bit, the result of each comparison forming a hidden output.

18. The integrated circuit of claim 1, wherein the access control circuitry is configured to receive a value inputted into the integrated circuit and, on the basis of the received value, to allow the series of hidden outputs to be outputted from the integrated circuit.

19. The integrated circuit of claim 18, wherein the access control circuitry comprises:
one-way circuitry configured to apply a one-way function to the received value;
comparison circuitry configured to compare the result of the one-way function with a device-specific value stored in the integrate circuit; and
enabler circuitry configured to receive the result of the comparison and, based on the received result, to allow the series of hidden outputs to be outputted from the integrated circuit.

20. The method of claim 19, wherein at least a part of the one-way circuitry forms part of the circuitry of the sequence generator.

21. The integrated circuit of claim 1, wherein each hidden output is a function of characteristics of the hidden output generator that vary due to fabrication characteristics among a plurality of like integrated circuits.

22. A method for authenticating an integrated circuit using an authentication station, comprising:
on the integrated circuit, performing the steps of:
generating a series of challenges;
generating a series of hidden outputs, each hidden output a function of a corresponding challenge in the series of challenges;
preventing disclosure of the hidden outputs outside the integrated circuit; and
generating a response sequence including a plurality of response parts, each response part a function of a corresponding plurality of hidden outputs.

23. The method of claim 22, further comprising providing the response sequence to the authentication station.

24. The method of claim 23, further comprising, at the authentication station, performing the steps of:
receiving the series of hidden outputs from the integrated circuit;
receiving the response sequence from the integrated circuit;
using the series of hidden outputs, determining a simulated response sequence; and
determining whether the received response sequence is substantially equivalent to the simulated response sequence.

25. The method of claim 22, further comprising enrolling the integrated circuit.

26. The method of claim 25, wherein enrolling the integrated circuit comprises:
providing at least one of the series of hidden outputs or parameters derived based on the series of hidden outputs to the authentication station;
receiving, from the authentication station, encrypted data corresponding to the series of hidden outputs or to the parameters derived based on the series of hidden outputs; and
storing the encrypted data in a nonvolatile memory on the integrated circuit.

27. The method of claim 26, wherein the parameters derived based on the series of hidden outputs comprise a parameterized form of the series of hidden outputs.

28. The method of claim 26, wherein the series of hidden outputs is provided to the authentication station on the basis of a password received from the authentication station.

29. The method of claim 28, wherein enrolling the integrated circuit comprises:
receiving the password from the authentication station;
performing a one-way function on the password;
comparing the result of the one-way function with a value stored on the integrated circuit; and
based on the result of the comparison, providing the series of hidden outputs to the authentication station.

30. The method of claim 22, wherein generating the series of challenges comprises generating the series of challenges on the basis of a first seed generated by the authentication station.

31. The method of claim 30, wherein generating the series of challenges further comprises generating the series of challenges on the basis of a second seed generated by the integrated circuit.

32. The method of claim 22, wherein generating the series of challenges comprises:
generating a series of generator values; and
selecting a subset of the bits of each generator value, each selected subset forming a challenge in the series of challenges.

33. The method of claim 22, wherein generating the response sequence includes, for each response part in the response sequence, operating on the corresponding plurality of hidden outputs with a nonlinear function.

34. The method of claim 22, wherein generating a series of hidden outputs includes generating the series of hidden outputs using physical unclonable function (PUF) circuitry.

35. The method of claim 34, wherein using PUF circuitry includes using delay-based PUF circuitry.

36. The method of claim 22, wherein generating the series of hidden outputs includes generating a subseries of hidden outputs corresponding to each challenge in the series of challenges.

37. The method of claim 36, wherein generating the series of hidden outputs further includes:
applying a plurality of permutation functions to a first challenge to generate a corresponding plurality of inner challenges;
applying each inner challenge to PUF circuitry to generate a corresponding hidden output in the subseries of hidden outputs corresponding to the first challenge; and
comparing the hidden outputs in subseries corresponding to the first challenge.

38. The method of claim 34, wherein generating the series of hidden bit outputs comprises:
using first PUF circuitry, generating a first PUF output based on a first challenge in the series of challenges;

using second PUF circuitry, generating a second PUF output based on the first challenge; and comparing the first PUF output and the second PUF output, the result of the comparison forming the hidden output corresponding to the first challenge.

39. The method of claim 34, wherein generating the series of hidden outputs comprises:

generating a first PUF output based on a first challenge in the series of challenges;

generating a second PUF output based on a second challenge in the series of challenges; and comparing the first PUF output and the second PUF output, the result of the comparison forming the hidden output corresponding to the first challenge.

40. The method of claim 34, wherein generating the series of hidden outputs comprises:

generating an inner challenge based on a first challenge in the series of challenges, the inner challenge longer than the first challenge; andusing the PUF circuitry to generate the hidden output based on the inner challenge.

* * * * *